United States Patent [19]

Carroll

[11] Patent Number: 5,538,332

[45] Date of Patent: Jul. 23, 1996

[54] VIBRATION INSULATING MEMBERS FOR PISTON VALVE ASSEMBLY

[75] Inventor: John B. Carroll, Irwin, Pa.

[73] Assignee: Westinghouse Air Brake Company, Wilmerding, Pa.

[21] Appl. No.: 328,192

[22] Filed: Oct. 24, 1994

[51] Int. Cl.⁶ .................................................. B60T 8/00
[52] U.S. Cl. .................................................. 303/28; 251/64
[58] Field of Search .............................. 267/161; 303/28, 303/33, 56, 40, 86; 251/64, 61.2; 137/505; 188/2 R, 3 R

[56] References Cited

U.S. PATENT DOCUMENTS

| | | | |
|---|---|---|---|
| 2,650,617 | 9/1953 | Wasser | 251/77 |
| 2,857,887 | 10/1958 | Rosback | 251/64 |
| 2,994,565 | 8/1961 | McClure | 303/42 |
| 3,148,919 | 9/1964 | Simmons | 303/22.5 |
| 4,126,152 | 11/1978 | Kirk | 251/64 |
| 4,542,852 | 9/1985 | Orth | 267/161 |
| 5,077,872 | 1/1992 | Guthammer | 267/161 |

Primary Examiner—Robert J. Oberleitner
Assistant Examiner—C. T. Bartz
Attorney, Agent, or Firm—Gary J. Falce

[57] ABSTRACT

A piston valve assembly in which a piston member is outfitted with a plastic insulator between the metal piston member and a cover with which the piston member is otherwise engageable in one case and between the metal piston member and a valve actuator stem with which the piston member is otherwise engageable in another case, thereby preventing metal-to-metal contact therebetween and consequent metallic abrasion and pulverization.

16 Claims, 2 Drawing Sheets

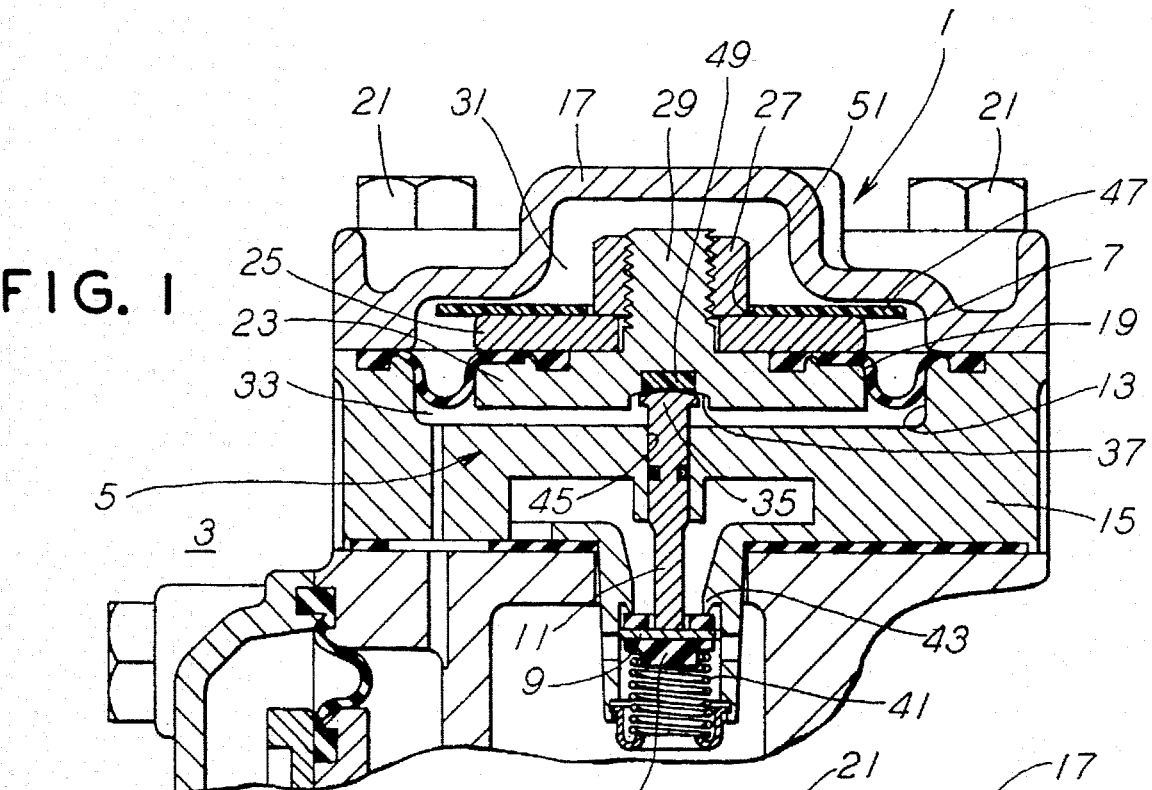
FIG. 1
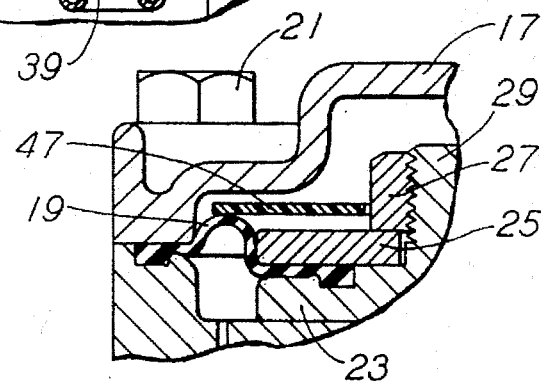
FIG. 2
FIG. 3

VIBRATION INSULATING MEMBERS FOR PISTON VALVE ASSEMBLY

BACKGROUND OF THE INVENTION

The present invention is related to improved railroad car brake control valves and particularly to such improvements as relate to the adverse effects of vibration on piston valves and the like.

With the trend toward light-weight railroad cars, such as aluminum coal hopper cars, for example, relatively severe vibration can occur when such light-weight cars are operated under less than ideal dynamic conditions. Wheel surface irregularities including out-of-roundness, worn truck components, and poor rail conditions are believed to contribute to such dynamic operating conditions that result in severe vibration of the brake control valve on the car.

Presently, the industry standard ABD, ABDW and ABDX brake control valves employ many moving parts including piston members that are made from aluminum, as well as non-moving parts such as aluminum valve covers and the like. Such high repetitive metal-to-metal contact between these aluminum parts, as may be induced by severe vibration, has been found to cause abrasive wear of the contacting parts. Such abrasive wear results in the accumulation of a fine, oxidized aluminum powder which migrates into the service piston assembly and absorbs the slide valve lubricant, leaving a rather thick, dry residue. Such loss of lubrication results in high slide valve friction, with high operating pressure differentials, and consequently erratic and unacceptable behavior of the aforementioned control valves.

SUMMARY OF THE INVENTION

It is an object of the present invention to insulate a piston valve assembly against metal-to-metal contact with an associated valve member and/or cover.

It is a further object of the invention to insulate a piston valve assembly in such a manner that induced piston vibration is minimized.

It is a still further object of the invention to insulate the piston valve assembly in such a manner that the insulating means itself does not cause abrasion of the insulated parts.

Briefly, these objectives are carried out in a piston valve assembly for a railroad car control valve device having a body that forms a cavity in which a piston member is disposed with an annular space therebetween across which a diaphragm is fixed between the piston member and body. One side of the piston member engages valve means while the opposite side is spaced apart from the body. An annular, non-metallic disc member is disposed in the space between the piston member and body to insulate the piston member from metal-to-metal engagement with the body, the disc member having a central opening through which an extension of the piston member projects. The size of the central opening in the disc member is larger than that of the piston member extension so that the disc member is axially free floating with limited lateral movement, and the outer diameter of the disc member is greater than the periphery of the piston member so as to extend at least partially into the annular space between the piston member and body with such limited lateral movement of said disc member.

These objects and other objects and advantages of the invention will become apparent from the following more detailed explanation when taken in conjunction with the accompanying drawings in which:

FIG. 1 is a partial sectional view of the accelerated service release valve employed in the aforementioned ABD, ABDW and ABDX brake control valve devices in which the piston valve assembly thereof is modified to incorporate an insulator washer between the piston and body in accordance with one aspect of the present invention;

FIG. 2 is a partial section view showing the piston valve assembly in an actuated position;

FIG. 3 is an isometric view of the insulator washer employed in FIGS. 1 and 2;

DESCRIPTION AND OPERATION

Figure 4:
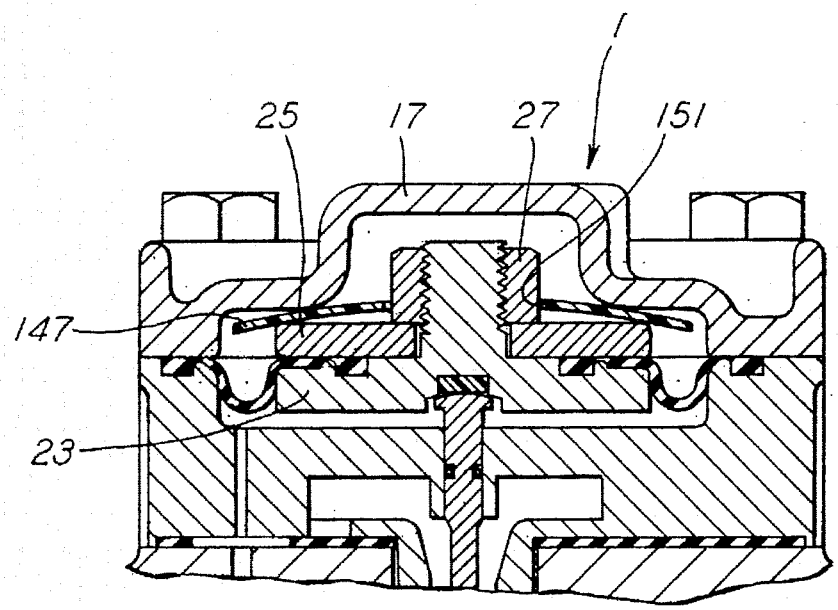
FIG. 4 is a view similar to FIG. 1 in which an alternate configuration of the insulator washer is employed.

As shown in FIG. 1, an accelerated service release valve portion 1 of a railroad car control valve device 3, such as the industry standard ABD, ABDW or ABDX type, comprises a piston valve assembly 5 including an aluminum piston member 7, a poppet valve 9 and an actuator stem 11. Piston member 7 is disposed in a cavity 13 in the release valve portion body 15 such that an annular space is formed between the piston member and body. Cavity 13 is enclosed by an aluminum cover 17, which clamps the outer periphery of an annular elastomeric diaphragm 19 to body 15 by means of cap screws 21. The inner periphery of diaphragm 19 is clamped between a base plate 23 of piston member 7 and a follower plate 25 by means of a nut 27. An extension 29 of base plate 23 projects through a central opening in follower plate 25 and is threaded to receive nut 27. Diaphragm 19 thus forms a chamber 31 between cover 17 and piston follower plate 25, and a chamber 33 between body 15 and piston base plate 23.

Actuator stem 11 is formed with a head 35 at one end that projects into chamber 33 and engages base plate 23 within a recess 37 formed therein. A valve element 39 of poppet valve 9 is urged by a spring 41 toward engagement with an annular seat 43 that is formed on body 15 and within which seat the opposite end of actuator stem 11 extends for engagement with valve element 39. Actuator stem 11 is operatively guided in a bore 45, while piston member 7 is properly maintained centered in cavity 13 by diaphragm 19.

In accordance with the present invention, piston valve assembly 5 has been modified in one aspect to incorporate a plastic insulator washer 47 between piston follower plate 25 and cover 17, and in another aspect to incorporate a plastic insulator plug 49 between head 35 of actuator stem 11 and piston base plate 23. Preferably, these plastic insulators 47, 49 are made from ultra-high molecular weight polyethylene, which exhibits such desirable characteristic as high abrasion resistance and a low coefficient of friction.

In one embodiment, as shown in FIG. 3, insulator washer 47 is planar in shape, being formed with a central opening 51 that is larger than the diameter of nut 27 in order to permit installation of washer 47 over the nut. In its installed position, washer 47 rests against follower plate 25 in the clearance space between the follower plate and cover 17 and is free to move axially relative to position member 7. The thickness of washer 47 is slightly less than the clearance space that exists between follower plate 25 and cover 17 when valve element 39 is seated and all free play is absent between valve element 39 and actuator stem 11 and between actuator stem 11 and plug 49 in piston base plate 23. In this manner, such variables as manufacturing tolerances and thermal expansion are accounted for so that the addition of the washer 47 does not effect unseating of valve element 39. Insulator washer 47 is sized so that its entire outer periphery extends at least partially into the annular spaced formed between the periphery of follower plate 25 and the wall of cavity 13, and preferably extends beyond the midpoint of this annular space. By extending the periphery of washer 47 beyond the periphery of piston follower plate 25, the sharp edge of the washer is displaced from the contact area between follower plate 25 and cover 17, thereby effectively unloading this sharp edge and accordingly alleviating its tendency to abrade cover 17.

It has been found in actual practice that the further the edge of washer 47 extends beyond the periphery of follower plate 25, the less the edge of washer 47 abrades cover 17. However, in maximizing this extension of the edge of washer 47, it will be appreciated that the convolution of diaphragm 19 abuts the washer when the diaphragm convolution assumes an inverted condition following movement to an actuated position, as shown in FIG. 2. By reason of the free-floating feature of insulator washer 47, however, there is no resistance to such abutment of washer 47, which is accordingly free to move axially upwardly upon engagement by diaphragm 19. Thus, the tendency of the washer to abrade and cut the diaphragm, as occurs when the insulator washer is fixed to the piston member, is alleviated. Accordingly, the outer periphery of washer 47 can be safely extended well beyond the periphery of piston follower plate 25 to eliminate abrasion of cover 17 by engagement with the sharp edge of insulator washer 47, as well as by metal-to-metal contact with piston follower plate 25.

Figure 5:
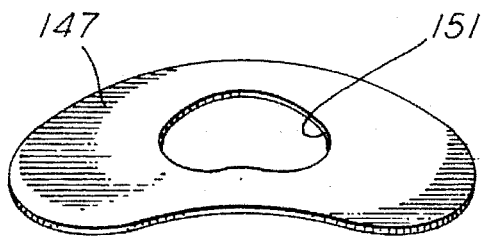
FIG. 5 is an isometric view of the insulator washer employed in FIG. 4.

In another embodiment of the invention, as shown in FIGS. 4 and 5, insulator washer 147 is non-planar in shape, having an arcuate warp in which the washer is bowed in a singular direction across its entire surface. This uni-directional bowing of washer 147 comes without added cost in the natural process of stamping the plastic insulator washer 147 from a sheet of compression molded, ultra high molecular weight polyethylene. The normal internal residual stresses in the plastic sheet are relieved in the washer 147 when the washer is stamped out, thereby causing washer 147 to be bowed uni-directionally in its free state. The thickness of washer 147 corresponds to that of washer 47, being slightly less than the clearance space between piston follower plate 25 and cover 17, but due to its bowed configuration the free height of washer 147 is greater than the clearance space so as to fill the entire clearance space, being under slight compression to exert a relatively light spring effect on piston valve assembly 5 to take-up free play of piston member 7. This is beneficial in reducing induced vibration of the piston valve assembly, without overcoming the valve closure force of spring 41, even in the event that washer 147 becomes further compressed due to thermal expansion increasing the thickness of washer 147 and/or the thickness of the clearance space becoming reduced due to the buildup of manufacturing tolerances between piston follower plate 23 and cover 17.

Insulator washer 147 is sized the same as washer 47, having a central opening 151 larger than the diameter of piston extension 29, and is installed in the same manner as insulator washer 47, preferably with its concavity adjacent piston follower plate 25.

Figure 6:
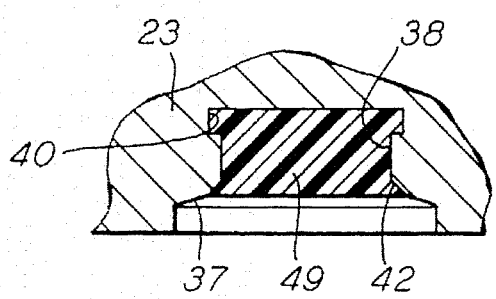
FIG. 6 is an enlarged, partial view of either FIG. 1 or FIG. 4 showing a preferred arrangement of an insulator plug between the piston and valve actuating stem in accordance with another aspect of the present invention.
Figure 7:
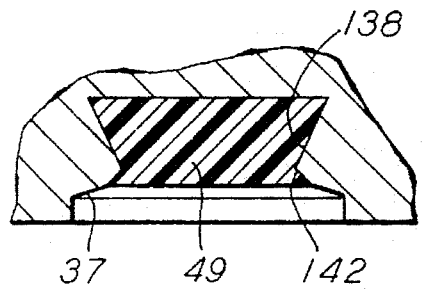
FIG. 7 is an enlarged, partial view of either FIG. 1 or FIG. 4 showing an alternate configuration of the insulator plug of FIG. 5.

In accordance with that aspect of the invention dealing with insulator plug 49, recess 37 in base plate 23 is formed with a counter recess 38 in which insulator plug 49 is secured, as shown in FIGS. 5 and 6, insulator plug 49 being generally circular in shape. In the arrangement of FIG. 5, counter recess 38 is formed with an undercut 40 at its base and a chamfer 42 between counter recess 38 and recess 37. Such an arrangement accommodates installation of an oversized plug 49 into counter recess 38 such that excess material flows into the undercut to securely fix the washer in place and to maintain such retention in face of thermal contraction of the insulator plug.

Alternatively, as shown in the arrangement of FIG. 6, a dovetail-shaped counter recess 138 is formed in recess 37, with a chamfer 142 between recess 37 and counter recess 138. This arrangement is an alternate way of providing for the installation of an oversized plug 49, which upon such installation becomes semi-permanently fixed in place by the flow of material into the undercut of the dovetail-shaped, counter recess 138 as a low-cost means of achieving positive retention of insulator plug 149.

In both of the foregoing arrangements, the installed insulator plug 49, 149 is substantially flush with recess 37, so as to be engageable with head 35 of actuator stem 11. In this manner, metal-to-metal engagement between head 35 and recess 37 in piston base plate 23 is prevented, as is wear of the respective surfaces. Accordingly, this source of accumulation of aluminum particulates and residue due to metal-to-metal abrasion is eliminated.

What is claimed is:

1. A piston valve assembly for a railroad car control valve device comprising:
   (a) a body;
   (b) a cavity formed in said body;
   (c) a piston member disposed in said cavity, the diameter of said cavity being greater than the diameter of said piston member such that a generally annular space is formed therebetween, one side of said piston member being spaced apart from said body and having an extension projecting therefrom;
   (d) a diaphragm fixed between said body and said piston member and having a convolution formed within said annular space;
   (e) valve means operated by said piston member comprising:
      (i) a normally seated valve element; and
      (ii) an actuating stem having one end engaged with said valve element in said normally seated position thereof and another end engaged with the side of said piston member opposite said one side;
   (f) a first non-metallic insulator having a central opening through which said extension projects, said first insulator being ring-shaped and interposed in the space between the side of said piston member which is opposite to the side engaged with the actuating stem, and a portion of said body axially adjacent said piston member to provide metal-to-metal insulation therebetween, the diameter of said central opening being greater than the diameter of said extension of said piston member such that said first insulator is free to move axially relative to said piston member and the outer periphery of said first insulator being greater than the outer diameter of said piston member so as to extend into said annular space.

2. A piston valve assembly as recited in claim 1, wherein said outer periphery of said first insulator extends into said annular space beyond the midpoint thereof without engagement with the annular wall of said cavity.

3. A piston valve assembly as recited in claim 1, wherein said extension of said piston member coacts with said central opening in said first insulator to provide limited lateral displacement of said first insulator relative to said piston member.

4. A piston valve assembly as recited in claim 1, wherein the thickness of said first insulator is less than the space between said one side of said piston member and said body when free play is taken up between said piston member and said valve means.

5. A piston valve assembly as recited in claim 1, wherein said first insulator is plastic.

6. A piston valve assembly as recited in claim 1, wherein said first insulator is ultra high molecular weight polyethylene.

7. A piston valve assembly as recited in claim 1, wherein said first insulator is planar in shape.

8. A piston valve assembly as recited in claim 1, wherein said first insulator is non-planar.

9. A piston valve assembly as recited in claim 1, wherein said first insulator is bowed uni-directionally.

10. A piston valve assembly as recited in claim 9, wherein the thickness of said first insulator is less than the space between said one side of said piston member and said body when free play is taken up between said piston member and said valve means.

11. A piston valve assembly as recited in claim 10, wherein the free height of said first insulator between the outer periphery thereof and said central opening therein is at least as great as the space between said one side of said piston member and said body.

12. A piston valve assembly as recited in claim 1, further comprising:
  (a) said opposite side of said piston member having a recess; and
  (b) a second non-metallic insulator in said recess with which said other end of said actuator stem is engageable.

13. A piston valve assembly as recited in claim 12, wherein said second insulator is plastic.

14. A piston valve assembly as recited in claim 12, wherein said second insulator is ultra high molecular weight polyethylene.

15. A piston valve assembly as recited in claim 13, wherein said recess in said piston member comprises a bore terminating in an undercut at the base thereof, said second insulator having a diameter greater than the diameter of said bore prior to said second insulator being installed in said recess, whereby the plastic material of said second insulator upon installation thereof in said recess flows into said undercut.

16. A piston valve assembly as recited in claim 13, wherein said recess in said piston member is dovetail-shaped, the minimum diameter of said recess being less than the diameter of said second insulator prior to installation thereof.

* * * * *